(12) United States Patent
Sasaki

(10) Patent No.: US 12,142,279 B2
(45) Date of Patent: Nov. 12, 2024

(54) SPEECH PROCESSING DEVICE, SPEECH PROCESSING METHOD, AND RECORDING MEDIUM

(71) Applicant: NEC Corporation, Tokyo (JP)

(72) Inventor: Kazuyuki Sasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 312 days.

(21) Appl. No.: 17/630,632

(22) PCT Filed: Jul. 29, 2020

(86) PCT No.: PCT/JP2020/028955
§ 371 (c)(1),
(2) Date: Jan. 27, 2022

(87) PCT Pub. No.: WO2021/024869
PCT Pub. Date: Feb. 11, 2021

(65) Prior Publication Data
US 2022/0262363 A1    Aug. 18, 2022

(30) Foreign Application Priority Data

Aug. 2, 2019 (JP) .................... 2019-142951

(51) Int. Cl.
*G10L 15/25* (2013.01)
*G06V 10/22* (2022.01)
(Continued)

(52) U.S. Cl.
CPC .............. *G10L 15/25* (2013.01); *G06V 10/22* (2022.01); *G06V 40/171* (2022.01); *G10L 15/02* (2013.01);
(Continued)

(58) Field of Classification Search
CPC .......... G10L 15/25; G10L 15/02; G10L 15/22; G10L 2015/025; G06V 10/22; G06V 40/171
See application file for complete search history.

(56) References Cited

U.S. PATENT DOCUMENTS 5,528,728 A * 6/1996 Matsuura ................ G10L 15/12
704/254
5,884,257 A    3/1999 Maekawa et al.
(Continued)

FOREIGN PATENT DOCUMENTS

JP    S59-182687 A    10/1984
JP    H08-009254 A    1/1996
(Continued)

OTHER PUBLICATIONS

Extended European Search Report for EP Application No. 20850688.1, dated on Aug. 22, 2022.
(Continued)

*Primary Examiner* — Bhavesh M Mehta
*Assistant Examiner* — Darioush Agahi
(74) *Attorney, Agent, or Firm* — Sughrue Mion, PLLC

(57) ABSTRACT

A speaker extracting unit extracts a speaker area from an image. A first utterance data generating unit, on the basis of the shape of the lips of the speaker, generates first utterance data indicating the content of the utterance by the speaker. A second utterance data generating unit, on the basis of a speech signal corresponding to the utterance by the speaker, generates second utterance data indicating the content of the utterance by the speaker. A comparison unit compares the first utterance data and the second utterance data with each other.

9 Claims, 13 Drawing Sheets

(51) Int. Cl.
*G06V 40/16* (2022.01)
*G10L 15/02* (2006.01)
*G10L 15/22* (2006.01)

(52) U.S. Cl.
CPC ........ *G10L 15/22* (2013.01); *G10L 2015/025* (2013.01)

(56) References Cited

U.S. PATENT DOCUMENTS

| | | | |
|---|---|---|---|
| 2002/0116197 A1 | 8/2002 | Erten | |
| 2004/0068408 A1* | 4/2004 | Qian | G10L 15/25 704/E21.02 |
| 2005/0047664 A1* | 3/2005 | Nefian | G06F 18/256 382/228 |
| 2009/0147995 A1* | 6/2009 | Sawada | G06V 40/168 382/103 |
| 2010/0189305 A1* | 7/2010 | Capless | G10L 15/25 725/134 |
| 2010/0204987 A1 | 8/2010 | Miyauchi | |
| 2010/0332229 A1 | 12/2010 | Aoyama et al. | |
| 2011/0224978 A1 | 9/2011 | Sawada | |
| 2017/0256262 A1* | 9/2017 | Ramachandra | G10L 15/14 |
| 2018/0158450 A1 | 6/2018 | Tokiwa et al. | |
| 2019/0371318 A1* | 12/2019 | Shukla | G10L 15/083 |
| 2020/0234479 A1 | 7/2020 | Teruuchi | |
| 2020/0335121 A1* | 10/2020 | Mosseri | G10L 21/18 |

FOREIGN PATENT DOCUMENTS

| | | |
|---|---|---|
| JP | H08-187368 A | 7/1996 |
| JP | 2004-024863 A | 1/2004 |
| JP | 2008-160667 A | 7/2008 |
| JP | 2010-185975 A | 8/2010 |
| JP | 2010-262424 A | 11/2010 |
| JP | 2011-013731 A | 1/2011 |
| JP | 2013-172411 A | 9/2013 |
| JP | 2018-091954 A | 6/2018 |
| JP | 2019-125927 A | 7/2019 |
| WO | 02/029784 A1 | 4/2002 |
| WO | 2007/114346 A1 | 10/2007 |

OTHER PUBLICATIONS

IN Office Action for IN Application No. 202217005467, mailed on Jul. 5, 2022 with English Translation.
International Search Report for PCT Application No. PCT/JP2020/028955, mailed on Sep. 29, 2020.
English translation of Written opinion for PCT Application No. PCT/JP2020/028955, mailed on Sep. 29, 2020.
Japanese Office Action for JP Application No. 2021-537252 mailed on Feb. 28, 2023 with English Translation.

* cited by examiner

SPEECH PROCESSING DEVICE, SPEECH PROCESSING METHOD, AND RECORDING MEDIUM

This application is a National Stage Entry of PCT/JP2020/028955 filed on Jul. 29, 2020, which claims priority from Japanese Patent Application 2019-142951 filed on Aug. 2, 2019, the contents of all of which are incorporated herein by reference, in their entirety.

TECHNICAL FIELD

This disclosure relates to a speech processing device, a speech processing method, and a recording medium and, in particular, to a speech processing device, a speech processing method, and a recording medium which process speech associated to utterance.

BACKGROUND ART

It is disclosed in PTL 1 that contents of utterance is reproduced from a speech signal by speech recognition. Specifically, it is described in PTL 1 that sound of utterance made by a person is collected by using a mike (microphone) and a speech signal outputted from the mike is converted to text data (character information).

Disclosed in PTL 2 is a technology in which lip patterns and speech of a speaker are collated with previously registered data and in a case where matching results from the collation, specific character information is outputted.

Disclosed in PTL 3 as related literature is a technology in which from a moving image including speech made by a speaker, relationship between shapes of lips and phonemes is learned.

CITATION LIST

Patent Literature

[PTL 1] JP 2008-160667 A
[PTL 2] JP H08-009254 A
[PTL 3] JP 2011-013731 A

SUMMARY OF INVENTION

Technical Problem

However, in the technology of the speech recognition described in each of the PTL 1 and PTL 2, considering a magnitude of influence of noise with respect to speech (speaking) made by utterance of a person is not assumed. In such a case, for example, when contents of utterance are reproduced from the speech, it is likely that the contents of the utterance cannot be accurately reproduced.

In view of the above-described problem, this disclosure has been made, and one of objects thereof is to provide a speech processing device and the like which enable processing in consideration of influence of noise with respect to speech made by utterance of a person.

Solution to Problem

A speech processing device according to one aspect of this disclosure includes: a speaker extraction means configured to extract a region of a speaker from an image; a first utterance data generation means configured to generate first utterance data showing contents of utterance of the speaker based on shapes of lips of the speaker; a second utterance data generation means configured to generate second utterance data showing contents of utterance of the speaker based on a speech signal being associated to the utterance of the speaker; and a collation means configured to collate the first utterance data and the second utterance data.

A speech processing method according to one aspect of this disclosure includes: extracting a region of a speaker from an image; generating first utterance data showing contents of utterance of the speaker based on shapes of lips of the speaker; generating second utterance data showing contents of utterance of the speaker based on a speech signal being associated to the utterance of the speaker; and collating the first utterance data and the second utterance data.

A recording medium according to one aspect of this disclosure has stored therein a program being configured to cause a computer to execute: extracting a region of a speaker from an image; generating first utterance data showing contents of utterance of the speaker based on shapes of lips of the speaker; generating second utterance data showing contents of utterance of the speaker based on a speech signal being associated to the utterance of the speaker; and collating the first utterance data and the second utterance data.

EXAMPLE EMBODIMENTS

Example Embodiment 1

Figure 1:
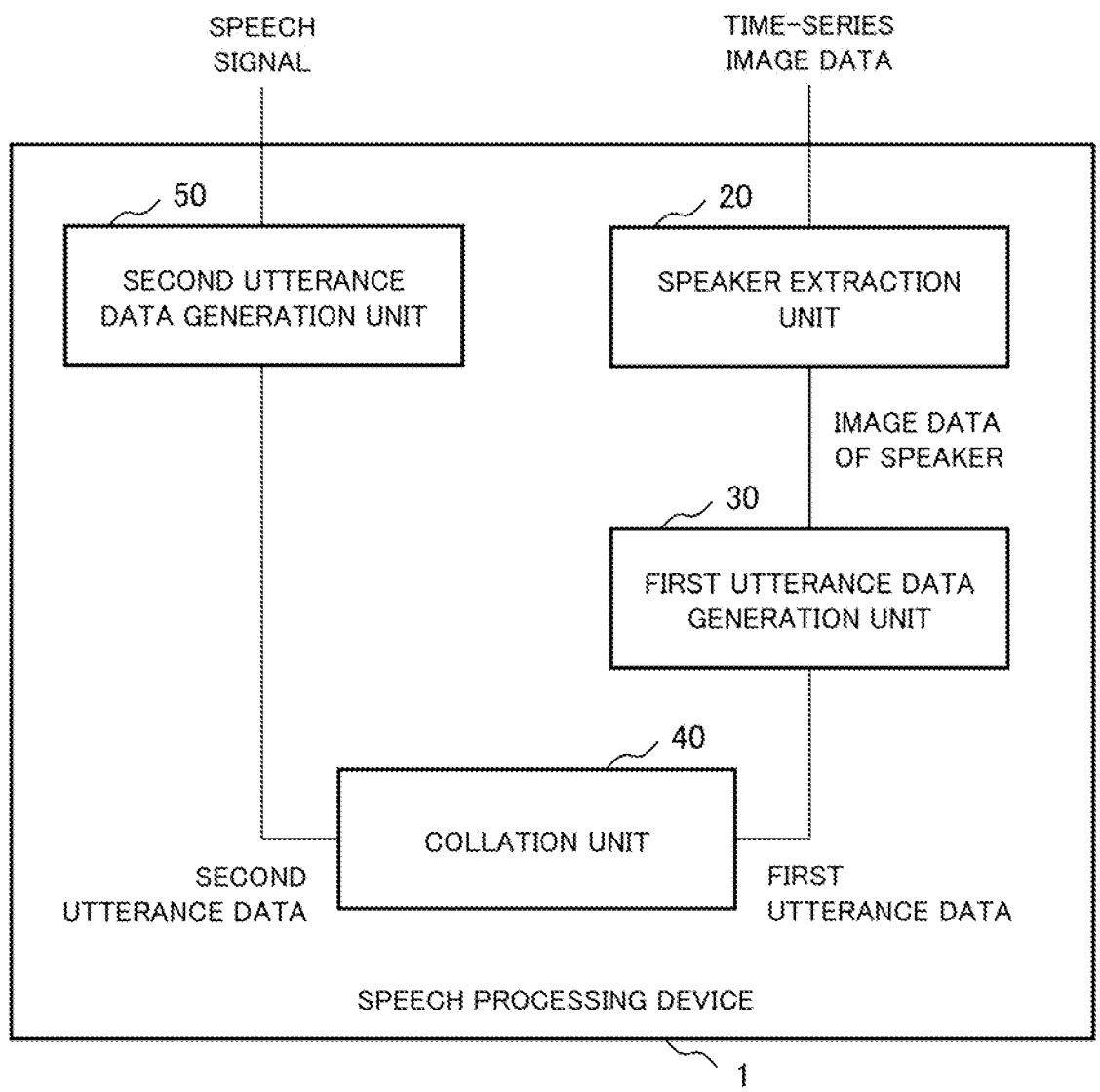
FIG. 1 is a block diagram showing one example of a configuration of a speech processing device according to an example embodiment 1.
Figure 2:
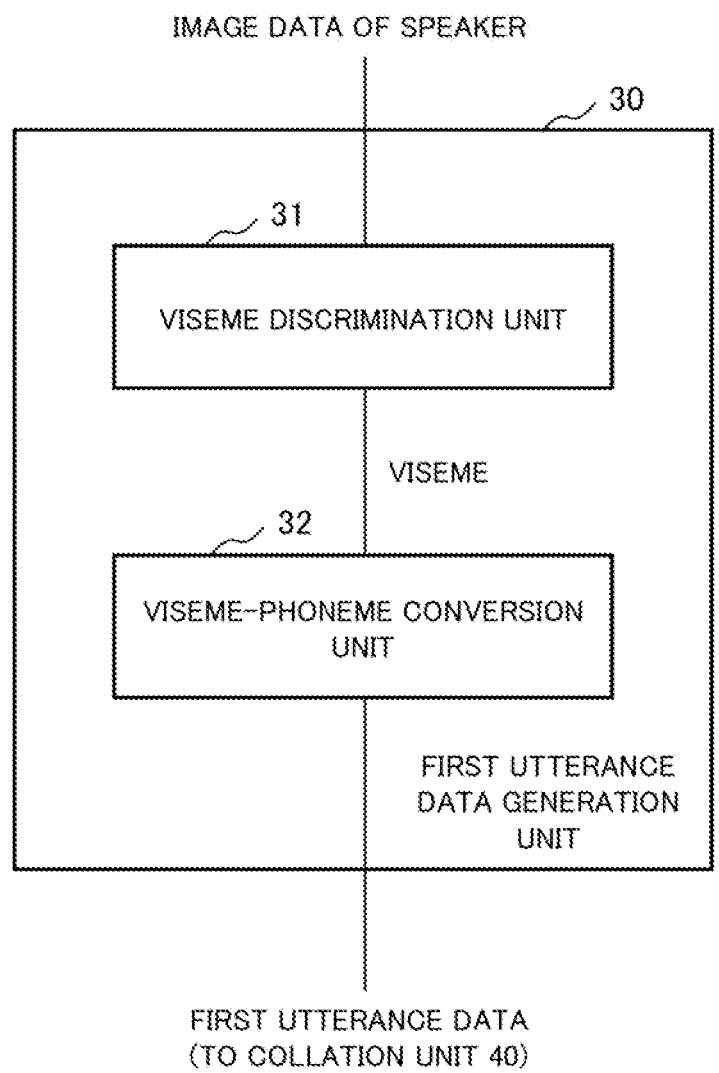
FIG. 2 is a block diagram showing one example of a configuration of a first utterance data generation unit which the speech processing device according to the example embodiment 1 includes.
Figure 3:
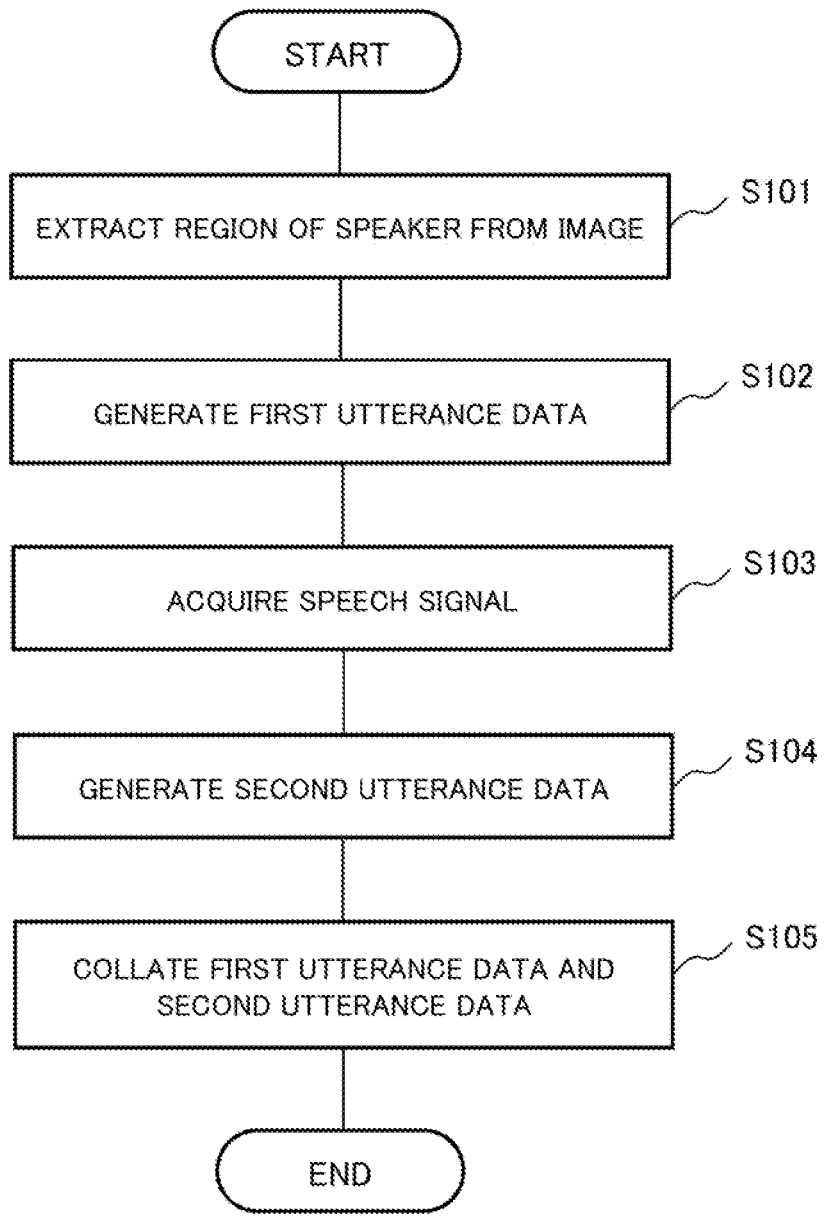
FIG. 3 is a flowchart showing one example of a flow of operation of the speech processing device according to the example embodiment 1.

With reference to FIGS. 1 to 3, an example embodiment 1 will be described.

Speech Processing Device 1

With reference to FIG. 1, a configuration of a speech processing device 1 according to the present example embodiment 1 will be described. FIG. 1 is a block diagram showing one example of the configuration of the speech processing device 1. As shown in FIG. 1, the speech processing device 1 includes a speaker extraction unit 20, a first utterance data generation unit 30, a collation unit 40, and a second utterance data generation unit 50. Functions of the units of the speech processing device 1 according to the present example embodiment 1 (and a speech processing device according to each of the later-described example embodiments) may be achieved as software by executing a program which is read by a processor into a memory or may be achieved as hardware such as an intelligent camera.

The speaker extraction unit 20 extracts a region of a speaker from an image. The speaker extraction unit 20 is one example of a speaker extraction means.

Specifically, the speaker extraction unit 20 acquires pieces of time-series image data from a camera, not shown, or the like. For example, the pieces of time-series image data are an image frame of a moving image in a certain period of time. Alternatively, the pieces of time-series image data may be a plurality of pieces of data of still images which are captured at predetermined time intervals. In a case where the functions of the speaker extraction unit 20 are achieved by the intelligent camera, the intelligent camera itself captures the time-series image data.

The speaker extraction unit 20 subjects the acquired time-series image data to image analysis, thereby extracting the region of the speaker from the pieces of image data. For example, the speaker extraction unit 20 detects the region of the person from the pieces of the image data by using a discriminator which has learned characteristics of the person (personality) (also referred to as a learned model). The detected region of the person is a region of an image which includes at least one part of the person. The region of the person is, for example, a rectangular region which encloses a face part of the person in the image data.

Furthermore, the speaker extraction unit 20 identifies a part of lips of the person from the image data of the detected region of the person. The speaker extraction unit 20 determines the same person among the pieces of time-series image data by, for example, face authentication (collation) or other means. The speaker extraction unit 20 detects a difference (that is, a change) in the shapes of lips of the same person among the pieces of time-series image data. In a case where the shapes of lips of the same person have changed among the pieces of time-series image data, the speaker extraction unit 20 determines that the person is a speaker.

The speaker extraction unit 20 transmits image data including the region of the person determined as the speaker (hereinafter, there may be a case where the region of the person is referred to as the region of the speaker) (hereinafter, there may be a case where the image data is referred to as image data of the speaker) to the first utterance data generation unit 30.

The first utterance data generation unit 30 generates first utterance data showing contents of utterance of the speaker based on the shapes of lips of the speaker. The first utterance data generation unit 30 is one example of a first utterance data generation means. The first utterance data generation unit 30 may generate the first utterance data by using the technology described in PTL 3 (JP 2011-13731 A). Alternatively, as described below, the first utterance data generation unit 30 can also generate the first utterance data directly from the image data of the speaker.

FIG. 2 is a block diagram showing one example of a configuration of the first utterance data generation unit 30. As shown in FIG. 2, the first utterance data generation unit 30 includes a viseme discrimination unit 31 and a viseme-phoneme conversion unit 32.

The viseme discrimination unit 31 receives the image data of the speaker from the speaker extraction unit 20. The viseme discrimination unit 31 identifies the shapes of lips of the speaker based on the image data of the speaker. Then, viseme discrimination unit 31 discriminates a viseme from the shapes of lips of the speaker. The viseme discrimination unit 31 is one example of a viseme discrimination means.

The viseme means shapes of lips of the speaker at an instant at which the speaker speaks one phoneme. The phoneme is a minimum unit of the speech which a listener can discriminate in one language. Specifically, the phoneme shows a vowel, a consonant, or a semivowel discriminated in one language.

The viseme discrimination unit 31 transmits information showing the viseme to the viseme-phoneme conversion unit 32.

The viseme-phoneme conversion unit 32 receives the information showing the viseme from the viseme discrimination unit 31. The viseme-phoneme conversion unit 32 converts the information showing the viseme to data of the phoneme and generates the first utterance data including time-series data of one phoneme or a plurality of phonemes. The viseme-phoneme conversion unit 32 is one example of a viseme-phoneme conversion means.

Specifically, with reference to a viseme-phoneme correspondence table (not shown) showing correspondence relationship between the viseme and the phoneme, the viseme-phoneme conversion unit 32 retrieves data of a phoneme associated to the discriminated viseme from the shapes of lips of the speaker and outputs the data. The viseme-phoneme correspondence table shows one-to-one correspondence relationship between the viseme and the phoneme. As described above, the viseme-phoneme conversion unit 32 executes conversion from the viseme to the phoneme.

The viseme-phoneme conversion unit 32 transmits, as the first utterance data, information showing the phoneme or phonemes (data of the phoneme or phonemes) associated to the viseme or visemes discriminated from the shapes of lips of the speaker and arrangement order of the phoneme or phonemes (that is, time-series order of the phoneme or phonemes) to the collation unit 40. For example, the first utterance data has a data structure with order numbers (1, 2, 3, . . . ) added to one phoneme or a plurality of phonemes.

Alternatively, as described above, the first utterance data generation unit 30 may generate the first utterance data directly from the image data of the speaker. For example, by using a deep learning method, the first utterance data generation unit 30 may train a model (for example, a neural network) so as to be operable to discriminate the associated phoneme or phonemes or the speech signal from the image data of the speaker. In this case, the first utterance data generation unit 30 inputs the image data of the speaker to the learned model. The learned model discriminates the associated phoneme or phonemes or the speech signal from the inputted image data of the speaker and outputs a discrimination result. Based on the outputs from the learned model, the first utterance data generation unit 30 generates the first utterance data.

In a case where the speaker extraction unit 20 has extracted regions of a plurality of different speakers from the time-series image data, the first utterance data generation unit 30 generates the first utterance data for each of the regions of speakers. In other words, the first utterance data generation unit 30 generates the plurality of pieces of the first utterance data associated to the plurality of speakers.

The first utterance data generation unit 30 transmits the generated first utterance data to the collation unit 40 shown in FIG. 1.

Based the speech signal associated to the utterance of the speaker, the second utterance data generation unit 50 shown in FIG. 1 generates second utterance data showing contents of the utterance of the speaker. The second utterance data generation unit 50 is one example of a second utterance data generation means.

Specifically, first, inputted to the second utterance data generation unit 50 is a speech signal associated to the utterance of the speaker. For example, the second utterance data generation unit 50 receives, from a mike, a speech signal associated to the utterance of the speaker whose sound is collected by the mike. An image of the speaker whose sound of the utterance is collected by the mike is included in the time-series image data which the speaker extraction unit 20 receives.

Alternatively, the second utterance data generation unit 50 may acquire a previously recorded speech signal. In this case, an image of the speaker whose has spoken is included in the recorded time-series image data.

The second utterance data generation unit 50 generates the second utterance data from the inputted speech signal.

In a first method, the second utterance data generation unit 50 generates, as the second utterance data, information showing a phoneme or phonemes associated to the inputted speech signal and arrangement order of the phoneme or phonemes (that is, time-series order of the phoneme or phonemes).

In a second method, the second utterance data generation unit 50 generates, as the second utterance data, information showing a single sound or single sounds included in the inputted speech signal and arrangement order of the single sound or single sounds (that is, time-series order of the single sound or single sounds). The single sound is a sound constituting one syllable and is a minimum unit of the speech. In general, the single sound is represented by a speech signal of a basic frequency and a speech signal of a multiple of the basic frequency.

Here, a concept of the above-described phoneme is different from a concept of the single sound. The phoneme is a speech which is discriminated as one single sound in one language. There is a case where some of the single sounds are discriminated as the same phonemes. For example, although [sh] and [s] are single sounds (consonants) which are different from each other, since in Japanese, [sh] and [s] are not discriminated, [sh] and [s] are determined as the same phonemes.

In description given below, in order to discriminate the second utterance data generated in the first method and the second utterance data generated in the second method, the former is referred to as phoneme data and the latter is referred to as single sound data.

The second utterance data generation unit 50 transmits the generated second utterance data to the collation unit 40.

The collation unit 40 collates the first utterance data and the second utterance data. The collation unit 40 is one example of a collation means.

Specifically, the collation unit 40 receives the first utterance data from the first utterance data generation unit 30. The collation unit 40 receives the second utterance data from the second utterance data generation unit 50. The collation unit 40 collates the first utterance data and the second utterance data.

In a case where there is a plurality of pieces of the first utterance data, the collation unit 40 collates each of the plurality of pieces of the first utterance data and the second utterance data.

In the present example embodiment 1, the second utterance data may be any of the above-described phoneme data and the single sound data. First, a case where the second utterance data is the phoneme data, that is, a case where the second utterance data is the information showing the phoneme or phonemes associated to the speech signal and the arrangement order of the phoneme or phonemes will be described below.

Method of Collation: Example 1

In the present example 1, the collation unit 40 generates a first characteristic vector on which a characteristic or characteristics of the phoneme or phonemes included in the first utterance data are arranged in accordance with the order numbers added to the phoneme or phonemes. The collation unit 40 generates a second characteristic vector on which a characteristic or characteristics of the phoneme or phonemes included in the second utterance data are arranged in accordance with the order numbers added to the phoneme or phonemes. For example, each of the characteristic vectors of the phonemes is an amplitude, power, a power spectrum, or mel-frequency cepstrum coefficients (MFCC) of a standard speech signal showing the phoneme or phonemes. These characteristic vectors can be obtained by subjecting the speech signal showing the phoneme or phonemes to various conversion.

The collation unit 40 calculates a distance between the first characteristic vector and the second characteristic vector. The collation unit 40 calculates a degree of similarity between the first characteristic vector and the second characteristic vector based on a magnitude of the calculated distance. The degree of similarity is represented by one numerical value, for example, from zero (with no similarity at all) to one (complete matching).

In a case where the degree of similarity exceeds a threshold value, the collation unit 40 determines that the first utterance data and the second utterance data are the same as each other (success in collation). On the other hand, in a case where the degree of similarity is equal to or less than the threshold value, the collation unit 40 determines that the first utterance data and the second utterance data are not the same as each other (failure in collation).

Method of Collation: Example 2

In the present example 2, the collation unit 40 performs matching between individual phonemes included in the first utterance data and individual phonemes included in the second utterance data.

More specifically, the collation unit 40 determines whether a phoneme with an order number n (=1, 2, . . . ) added, included in the first utterance data and a phoneme with the same order number n (=1, 2, . . . ) as above added, included in the second utterance data are the same as each other. In a case where a number of the phonemes included in the first utterance data is N1 and a number of the phonemes included in the second utterance data is N2 (≤N1), the collation unit 40 determines whether each of phonemes from the first to the N1th included in the first utterance data and each of phonemes from the first to the N1th included in the second utterance data are the same as each other, respectively.

The collation unit 40 counts a number of times at which the matching has succeeded, that is, a number of the phonemes which are the same as each other between the first utterance data and the second utterance data.

In a case where the number of times at which the matching has succeeded exceeds a predetermined number, the collation unit 40 determines that the first utterance data and the second utterance data are the same as each other (success in collation). On the other hand, in a case where the number of times at which the matching has succeeded is equal to or less than the predetermined number, the collation unit 40 determines that the first utterance data and the second utterance data are not the same as each other (failure in collation).

Subsequently, a case where the second utterance data is the single sound data, that is, a case where the second utterance data is the information showing the single sound or single sounds included in the speech signal and the arrangement order of the single sound or single sounds will be described below.

Method of Collation: Example 3

In the present example 3, in a certain one language, the collation unit 40 deems one single sound or a plurality of single sounds which are not mutually discriminated as the same phoneme. The collation unit 40 performs matching between each of one single sound or the plurality of single sounds which are deemed to be the same as each of individual phonemes included in the first utterance data and each of individual single sounds included in the second utterance data. A method of matching in the present example 3 is the same as that in a case where the second utterance data is the phoneme data.

Method of Collation: Example 4

In the present example 4, a method of collating both of the first utterance data and the second utterance data in a case where each of the first utterance data and the second utterance data is the speech signal will be described.

In the present example 4, the first utterance data generation unit 30 further converts the phoneme or phonemes, which the viseme-phoneme conversion unit 32 has converted from the viseme or visemes, to a speech signal associated to the phoneme or phonemes.

For example, with reference to a table (not shown) showing correspondence relationship between the phoneme or phonemes and the speech signal, the first utterance data generation unit 30 converts the phoneme or phonemes to the speech signal. The second utterance data generation unit 50 transmits, as the second utterance data, the inputted speech signal itself to the collation unit 40.

The collation unit 40 converts, to a spectrogram, each of the speech signal which is the first utterance data and the speech signal which is the second utterance data. The collation unit 40 performs pattern matching between a first spectrogram showing the first utterance data and a second spectrogram associated to the second utterance data and calculates a degree of similarity between the first spectrogram and the second spectrogram.

In a case where the degree of similarity exceeds a threshold value, the collation unit 40 determines that the first utterance data and the second utterance data match each other (success in collation). On the other hand, in a case where the degree of similarity is equal to or less than the threshold value, the collation unit 40 determines that the first utterance data and the second utterance data do not match each other (failure in collation).

By employing any method of the above-described examples 1 to 4, the collation unit 40 collates the first utterance data and the second utterance data.

The collation unit 40 outputs a result of the collation between the first utterance data and the second utterance data. For example, the collation unit 40 outputs, as the result of the collation, information showing whether the collation between the first utterance data and the second utterance data has succeeded.

Thus, the speech processing device 1 can perform processing in consideration of influence of noise with respect to the speech (that is, speaking) by the utterance of the speaker.

For example, the result of the collation by the collation unit 40 is used to associate the speaker and the utterance by the speaker (refer to an example embodiment 4). Alternatively, the result of the collation by the collation unit 40 may be used to correct the second utterance data by using the first utterance data (refer to an example embodiment 5).

Operation Flow of Speech Processing Device 1

With reference to FIG. 3, an operation flow of the speech processing device 1 according to the present example embodiment 1 will be described. FIG. 3 is a flowchart showing one example of the operation flow of the speech processing device 1.

As shown in FIG. 3, the speaker extraction unit 20 acquires the pieces of time-series image data and extracts the region of the speaker from each of the pieces of image data (S101). The speaker extraction unit 20 transmits the extracted image data of the speaker to the first utterance data generation unit 30.

The first utterance data generation unit 30 extracts a part of lips of the speaker from the image data of the speaker and based on the extracted shapes of lips of the speaker, generates the first utterance data (S102).

The first utterance data generation unit 30 transmits the generated first utterance data to the collation unit 40.

The second utterance data generation unit 50 acquires the speech signal associated to the utterance of the speaker (S103).

Based on the speech signal associated to the utterance of the speaker, the second utterance data generation unit 50 generates the second utterance data showing the contents of the utterance of the speaker (S104). The second utterance data generation unit 50 transmits the generated second utterance data to the collation unit 40.

The collation unit 40 receives the first utterance data from the first utterance data generation unit 30. The collation unit 40 receives the second utterance data from the second utterance data generation unit 50. Then, the collation unit 40 collates the first utterance data and the second utterance data (S105).

The collation unit 40 outputs the result of the collation in step S105. For example, the collation unit 40 outputs, as the result of the collation, information showing whether the collation between the first utterance data and the second utterance data has succeeded.

Then, the operation of the speech processing device 1 is finished.

Effect of the Present Example Embodiment

In the configuration of the present example embodiment, the speaker extraction unit 20 extracts the region of the speaker from the image. The first utterance data generation unit 30 generates the first utterance data showing the contents of the utterance of the speaker based on the shapes of lips of the speaker. The second utterance data generation unit 50 generates the second utterance data showing the contents of the utterance of the speaker based on the speech signal associated to the utterance of the speaker. The collation unit 40 collates the first utterance data and the second utterance data.

Thus, for example, in a case where the contents of the utterance are reproduced from the second utterance data, by using the first utterance data with which the collation by the collation unit 40 has succeeded, the second utterance data can be corrected. Specifically, for example, even in a case where there is noise in the second utterance data, a part where the noise is present can be reproduced based on the first utterance data. In other words, the speech processing device can reproduce the utterance from the speech signal at further high accuracy. Accordingly, the speech processing device according to the present example embodiment 1 exhibits effect to enable processing in consideration of influence of the noise with respect to the speech made by the utterance of the person.

Example Embodiment 2

Figure 4:
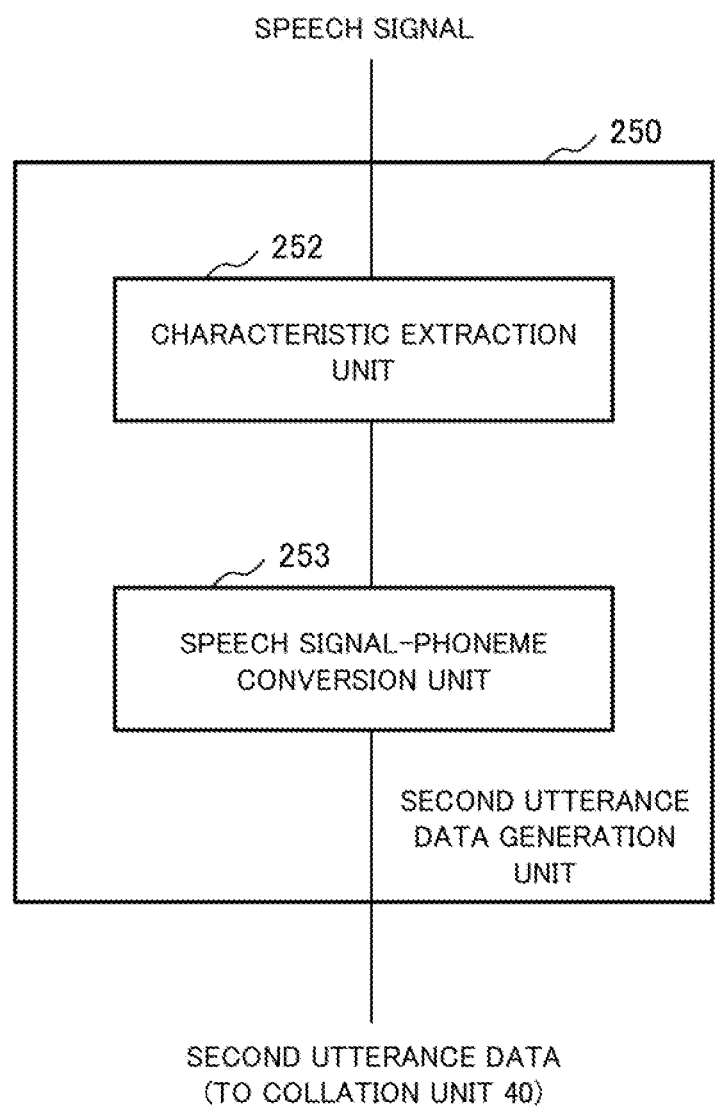
FIG. 4 is a block diagram showing one example of a configuration of a second utterance data generation unit which a speech processing device according to an example embodiment 2 includes.

With reference to FIG. 4, an example embodiment 2 will be described. In the present example embodiment 2, as to a case where second utterance data is phoneme data (that is, a case where the second utterance data is generated by employing the first method), a detailed configuration of a second utterance data generation unit will be described.

A configuration of a speech processing device according to the present example embodiment 2 is the same as the configuration of the speech processing device 1 (FIG. 1) described in the example embodiment 1. The speech processing device according to the present example embodiment 2 includes a second utterance data generation unit 250 (FIG. 4), instead of the second utterance data generation unit 50 (FIG. 1). Speech processing device The second utterance data according to the present example embodiment 2 is information showing a phoneme or phonemes associated to a speech signal and arrangement order of the phoneme or phonemes.

Second Utterance Data Generation Unit 250

FIG. 4 is a block diagram showing one example of the configuration of the second utterance data generation unit 250 according to the present example embodiment 2. As shown in FIG. 4, the second utterance data generation unit 250 includes a characteristic extraction unit 252 and a speech signal-phoneme conversion unit 253.

The characteristic extraction unit 252 subjects an inputted speech signal to preprocessing such as sampling (analog-digital transform (A/D Transform)) and filtering and thereafter, extracts a characteristic or characteristics from the inputted speech signal. The characteristic extraction unit 252 is one example of a characteristic extraction means. The characteristic of the speech signal is, for example, an amplitude of the speech signal or power or a spectrum (spectrum envelope) of the speech signal as to a certain frequency.

The characteristic extraction unit 252 transmits information showing the characteristic or characteristics extracted from the speech signal to the speech signal-phoneme conversion unit 253.

The speech signal-phoneme conversion unit 253 receives the information showing the characteristic or characteristics of the speech signal from the characteristic extraction unit 252. The speech signal-phoneme conversion unit 253 inputs the received characteristic or characteristics to a learned model.

The learned model is a model which is trained so as to be operable to discriminate a phoneme or phonemes from the characteristic or characteristics of the speech signal (for example, a neural network). As described above, the phoneme is a minimum unit of the speech which a listener can discriminate in one language. The learned model outputs a discrimination result of the phoneme associated to the inputted speech signal.

Based on the output from the learned model, the speech signal-phoneme conversion unit 253 converts the characteristic or characteristics of the speech signal to an associated phoneme or phonemes and generates second utterance data including one phoneme or a plurality of phonemes. The speech signal-phoneme conversion unit 253 is one example of a speech signal-phoneme conversion means.

The speech signal-phoneme conversion unit 253 transmits, as the second utterance data, information showing the phoneme or phonemes associated to the inputted speech signal and arrangement order of the phoneme or phonemes to a collation unit 40. In a data structure of the second utterance data, order numbers (1, 2, 3, . . . ) are added to one phoneme or a plurality of phonemes associated to the speech signal.

The collation unit 40 collates the first utterance data and the second utterance data. Specifically, by employing the method of collation described as the example 1 or 2 in the example embodiment 1, the collation unit 40 may collate the first utterance data and the second utterance data. In the present example embodiment 2, description as to the method of collation is omitted.

The collation unit 40 outputs a result of the collation between the first utterance data and the second utterance data. For example, the collation unit 40 outputs, as the result of the collation, information showing whether the collation between the first utterance data and the second utterance data has succeeded.

Effect of the Present Example Embodiment

In the configuration of the present example embodiment, the speaker extraction unit 20 extracts the region of the speaker from the image. The first utterance data generation unit 30 generates the first utterance data showing the contents of the utterance of the speaker based on the shapes of lips of the speaker. The second utterance data generation unit 250 generates the second utterance data showing contents of utterance of the speaker based on a speech signal associated to the utterance of the speaker.

The second utterance data generation unit 250 includes the characteristic extraction unit 252 and the speech signal-phoneme conversion unit 253. The characteristic extraction unit 252 extracts the characteristics from the speech signal. The speech signal-phoneme conversion unit 253 converts the inputted speech signal to a phoneme or phonemes associated to the inputted speech signal. The collation unit 40 collates the first utterance data and the second utterance data.

Thus, the speech processing device according to the present example embodiment 2 enables performing of processing in consideration of influence of noise with respect to the speech made by the utterance of a person. For example, in a case where the collation by the collation unit 40 has succeeded, the second utterance data is corrected by using the first utterance data, thereby allowing the speech processing device according to the present example embodiment 2 to reproduce the utterance from the speech signal at further high accuracy.

Example Embodiment 3

Figure 5:
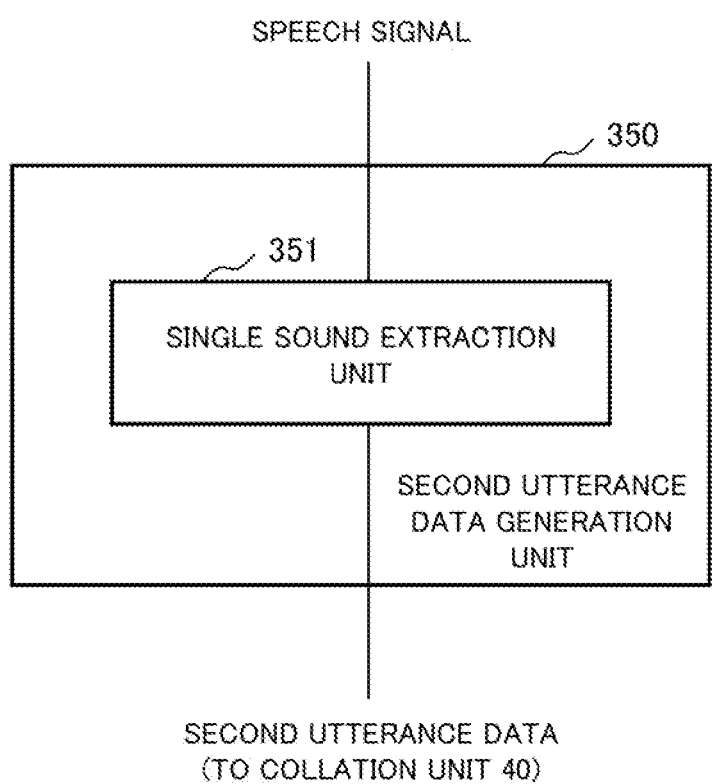
FIG. 5 is a block diagram showing one example of a configuration of a second utterance data generation unit which a speech processing device according to an example embodiment 3 includes.

With reference to FIG. 5, an example embodiment 3 will be described. In the present example embodiment 3, as to a case where second utterance data is single sound data (that is, a case where the second utterance data is generated by employing a second method), details of a second utterance data generation unit will be described.

A configuration of a speech processing device (not shown) according to the present example embodiment 3 is the same as the configuration of the speech processing device 1 (FIG. 1) described in the example embodiment 1. The speech processing device according to the present example embodiment 3 includes a second utterance data generation unit 350, instead of the second utterance data generation unit 50.

The second utterance data according to the present example embodiment 3 is information showing a single sound or single sounds included in a speech signal and arrangement order of the single sound or single sounds.

Second Utterance Data Generation Unit 350

In the present example embodiment 3, by employing a third method described in the example embodiment 1, the second utterance data generation unit 350 generates the second utterance data from an inputted speech signal.

FIG. 5 is a block diagram showing one example of a configuration of the second utterance data generation unit 350 according to the present example embodiment 3. As shown in FIG. 5, the second utterance data generation unit 350 includes a single sound extraction unit 351.

The single sound extraction unit 351 extracts a single sound or single sounds included in the inputted speech signal and generates the second utterance data including one single sound or a plurality of single sounds. The single sound extraction unit 351 is one example of a single sound extraction means. As described above, the single sound is represented by a speech signal of a basic frequency and a speech signal of a multiple of the basic frequency.

The single sound extraction unit 351 transmits, as the second utterance data, information showing the single sound or single sounds included in the inputted speech signal and arrangement order of the single sound or single sounds to a collation unit 40. In a data structure of the second utterance data, order numbers (1, 2, 3, . . . ) are added to one single sound or a plurality of single sounds associated to the speech signal.

The collation unit 40 collates the first utterance data and the second utterance data. Specifically, by employing the method of collation described as the example 3 in the example embodiment 1, the collation unit 40 may collate the first utterance data and the second utterance data.

The collation unit 40 outputs a result of the collation between the first utterance data and the second utterance data. For example, the collation unit 40 outputs, as the result of the collation, information showing whether the collation between the first utterance data and the second utterance data has succeeded.

Effect of the Present Example Embodiment

In the configuration of the present example embodiment, the speaker extraction unit 20 extracts the region of the speaker from the image. The first utterance data generation unit 30 generates the first utterance data showing the contents of the utterance of the speaker based on the shapes of lips of the speaker. The second utterance data generation unit 350 generates the second utterance data showing contents of utterance of the speaker based on the speech signal associated to the utterance of the speaker.

The second utterance data generation unit 350 includes the single sound extraction unit 351 whish extracts the single sound or single sounds included in the inputted speech signal. The single sound extraction unit 351 transmits, as the second utterance data, information showing the single sound or single sounds included in the inputted speech signal and arrangement order of the single sound or single sounds to a collation unit 40. The collation unit 40 collates the first utterance data and the second utterance data.

Thus, the speech processing device according to the present example embodiment 3 enables performing of processing in consideration of influence of noise with respect to the speech made by the utterance of a person. For example, in a case where the collation by the collation unit 40 has succeeded, the second utterance data is corrected by using the first utterance data, thereby allowing the utterance to be reproduced from the speech signal at further high accuracy.

Example Embodiment 4

Figure 6:
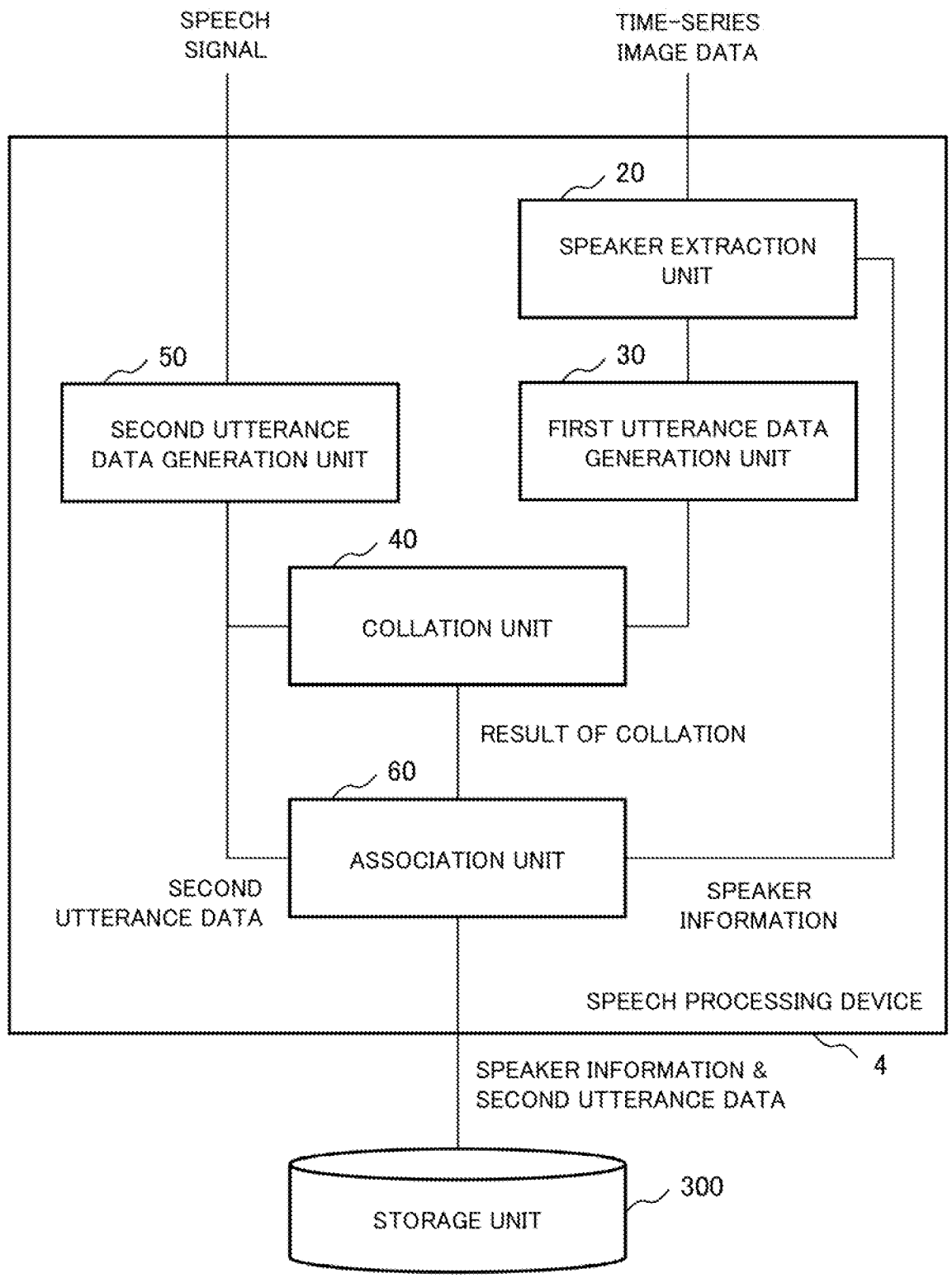
FIG. 6 is a block diagram showing one example of a configuration of a speech processing device according to an example embodiment 4.
Figure 7:
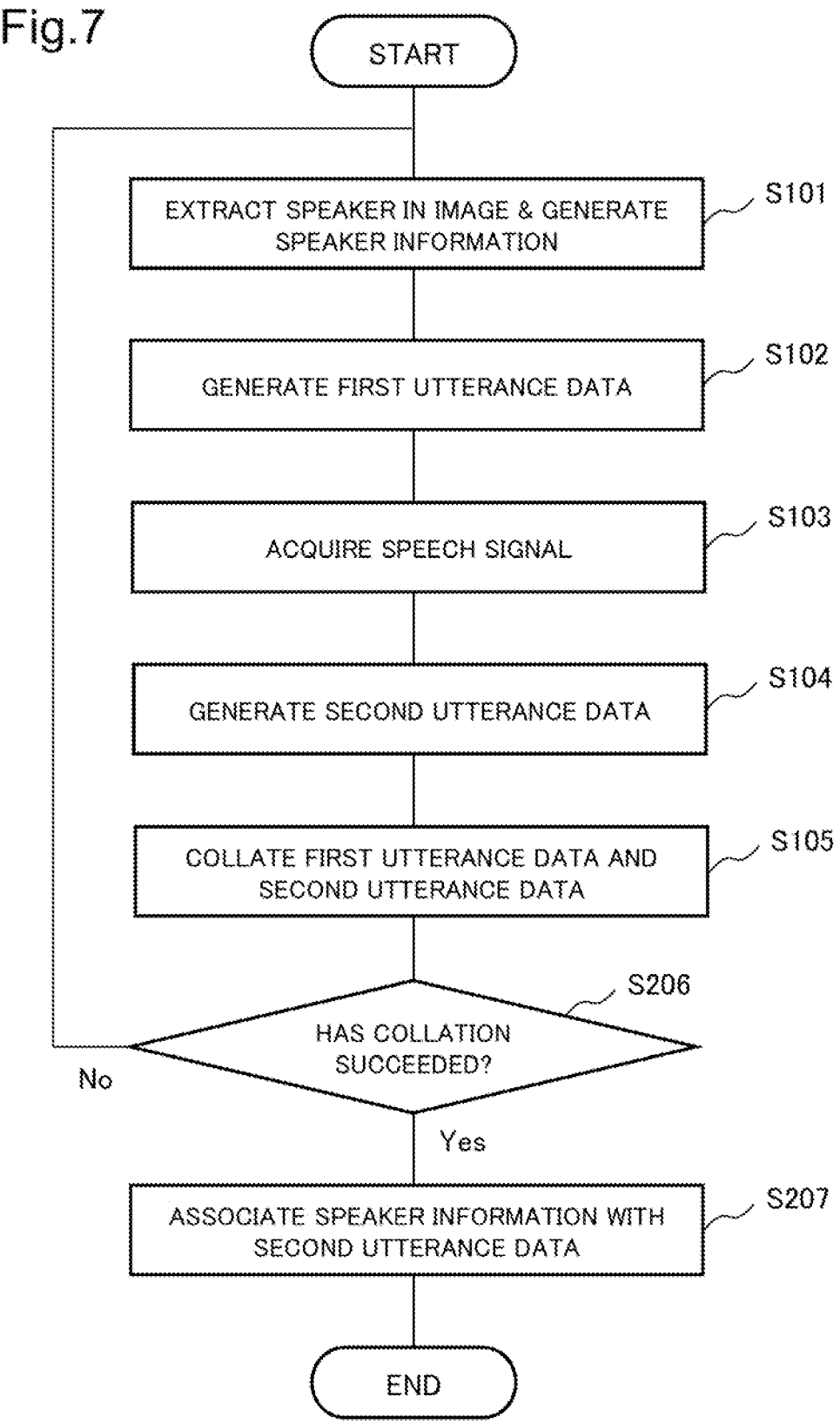
FIG. 7 is a flowchart showing one example of a flow of operation of the speech processing device according to the example embodiment 4.

With reference to FIGS. 6 and 7, an example embodiment 4 will be described. In the present example embodiment 4, a configuration in which based on a result of collation between first utterance data and second utterance data, the second utterance data associated to a speech signal associated to utterance of a speaker and speaker information which identifies the speaker are associated to each other will be described.

Speech Processing Device 4

With reference to FIG. 6, a configuration of a speech processing device 4 according to the present example embodiment 4 will be described. FIG. 6 is a block diagram showing one example of the configuration of the speech processing device 4.

As shown in FIG. 6, the speech processing device 4 includes a speaker extraction unit 20, a first utterance data generation unit 30, a collation unit 40, a second utterance data generation unit 50, and an association unit 60. In other words, the configuration of the speech processing device 4 according to the present example embodiment 4 is different from the configuration of the speech processing device 1 according to the example embodiment 1 in that the speech processing device 4 includes the association unit 60.

The association unit 60 is connected to a storage unit 300. The storage unit 300 may be connected to the speech processing device 4 via a wireless or wired network. Alternatively, the storage unit 300 may be one part of the speech processing device 4. The storage unit 300 is one example of a storage means.

In the present example embodiment 4, as described in the example embodiment 1, the speaker extraction unit 20 extracts a region of a speaker from time-series image data. Furthermore, the speaker extraction unit 20 generates speaker information which identifies the speaker extracted from the time-series image data.

For example, the speaker extraction unit 20 extracts a region of a face of the speaker from the time-series image data. Then, the speaker extraction unit 20 generates, as the speaker information, face image data of the speaker. Alternatively, the speaker extraction unit 20 may generate, as the speaker information, a characteristic vector showing a characteristic of the face of the speaker.

The speaker information is, for example, at least one of attribute information of the speaker, position information of the speaker, a face image of the speaker, and first utterance data. However, as long as the speaker information is the information to identify the speaker, the speaker information is not limited to these.

In a case where a plurality of speakers is detected from the time-series image data, the speaker extraction unit 20 generates the speaker information for each of the speakers. The speaker extraction unit 20 transmits the generated speaker information to the association unit 60.

The first utterance data generation unit 30 receives the image data of the speaker from the speaker extraction unit 20. The first utterance data generation unit 30 generates first utterance data by image analysis described in the example embodiment 1, based on the image data. The first utterance data generation unit 30 transmits the generated first utterance data to the collation unit 40.

As described in the example embodiment 1, the second utterance data generation unit 50 generates second utterance data. The second utterance data generation unit 50 transmits the generated second utterance data to the collation unit 40.

In the present example embodiment 4, the second utterance data may be any of the above-described phoneme data and single sound data.

The collation unit 40 receives the first utterance data from the first utterance data generation unit 30. The collation unit 40 receives the second utterance data from the second utterance data generation unit 50. The collation unit 40 collates the first utterance data and the second utterance data.

For example, by employing any method of collation in the examples 1 to 4 described in the example embodiment 1, the collation unit 40 collates the first utterance data and the second utterance data.

The collation unit 40 transmits a result of the collation to the association unit 60. For example, the collation unit 40 transmits, as the result of the collation, information or a flag which indicates that the collation between the first utterance data and the second utterance data has succeeded or failed to the association unit 60.

Based on the result of the collation, the association unit 60 associates the speaker information to identify the speaker in the image with the second utterance data. The association unit 60 is one example of an association means.

Specifically, the association unit 60 receives the speaker information from the speaker extraction unit 20. The association unit 60 receives the result of the above-described collation from the collation unit 40. As described above, the result of the collation is, for example, the information or flag showing that the collation between the first utterance data and the second utterance data has succeeded or failed.

In a case where the result of the collation shows that the collation between the first utterance data and the second utterance data has succeeded, based on the result of the collation by the collation unit 40, the association unit 60 associates the speaker information received from the speaker extraction unit 20 with the second utterance data received from the second utterance data generation unit 50. For example, the association unit 60 provides an identification (ID) for a combination of the speaker information and the second utterance data.

The association unit 60 stores the combination of the speaker information and the second utterance data together with the ID provided for the combination in the storage unit 300 shown in FIG. 6. Alternatively, the association unit 60 may store the associated speaker information and second utterance data on a network server, not shown, or the like. Alternatively, the association unit 60 may convert the second utterance data to a speech signal or text data associated to the utterance of the speaker, may link the converted speech signal or text data to the speaker information, and may store the converted speech signal or text data linked thereto in the storage unit 300.

Operation Flow of Speech Processing Device 4

With reference to FIG. 7, an operation flow of the speech processing device 4 according to the present example embodiment 4 will be described. FIG. 7 is a flowchart showing one example of the operation flow of the speech processing device 4. Since the operation flow from step S101 to step S105 shown in FIG. 7 is in common with the operation flow described in the example embodiment 1, in the present example embodiment 4, description as to S101 to S105 is omitted. An operation flow from step S206 shown in FIG. 7 will be described below.

As shown in FIG. 7, after the collation unit 40 has collated the second utterance data and the first utterance data (S105), the association unit 60 receives a result of the collation from the collation unit 40. In a case where the collation unit 40 has failed in the collation between the first utterance data and the second utterance data (No in S206), the processing returns to the initial step S101 of the operation flow shown in FIG. 6.

On the other hand, in a case where the collation unit 40 has succeeded in the collation between the first utterance data and the second utterance data (Yes in S206), the association unit 60 associates the speaker information received from the speaker extraction unit 20 with the second utterance data received from the second utterance data generation unit 50 (S207).

The association unit 60 stores the associated speaker information and second utterance data in the storage unit 300. Then, the operation of the speech processing device 4 according to the present example embodiment 4 is finished.

Effect of the Present Example Embodiment

In the configuration of the present example embodiment, the speaker extraction unit 20 extracts the region of the speaker from the image. The first utterance data generation unit 30 generates the first utterance data showing the contents of the utterance of the speaker based on the shapes of lips of the speaker. The second utterance data generation unit 50 generates the second utterance data showing the contents of the utterance of the speaker based on the speech signal associated to the utterance of the speaker. The collation unit 40 collates the first utterance data and the second utterance data.

Thus, processing in consideration of influence of noise with respect to the speech made by the utterance of a person can be performed.

Furthermore, based on the result of the collation, the association unit 60 associates the speaker information to identify the speaker in the image with the second utterance data. Thus, the speech processing device according to the present example embodiment 4 can easily create, for example, meeting minute data in which who speaks or speak and what is or are spoken are described. Even in a case where a plurality of persons is present, the speech processing device according to the present example embodiment 4 can identify the speakers.

Example Embodiment 5

Figure 8:
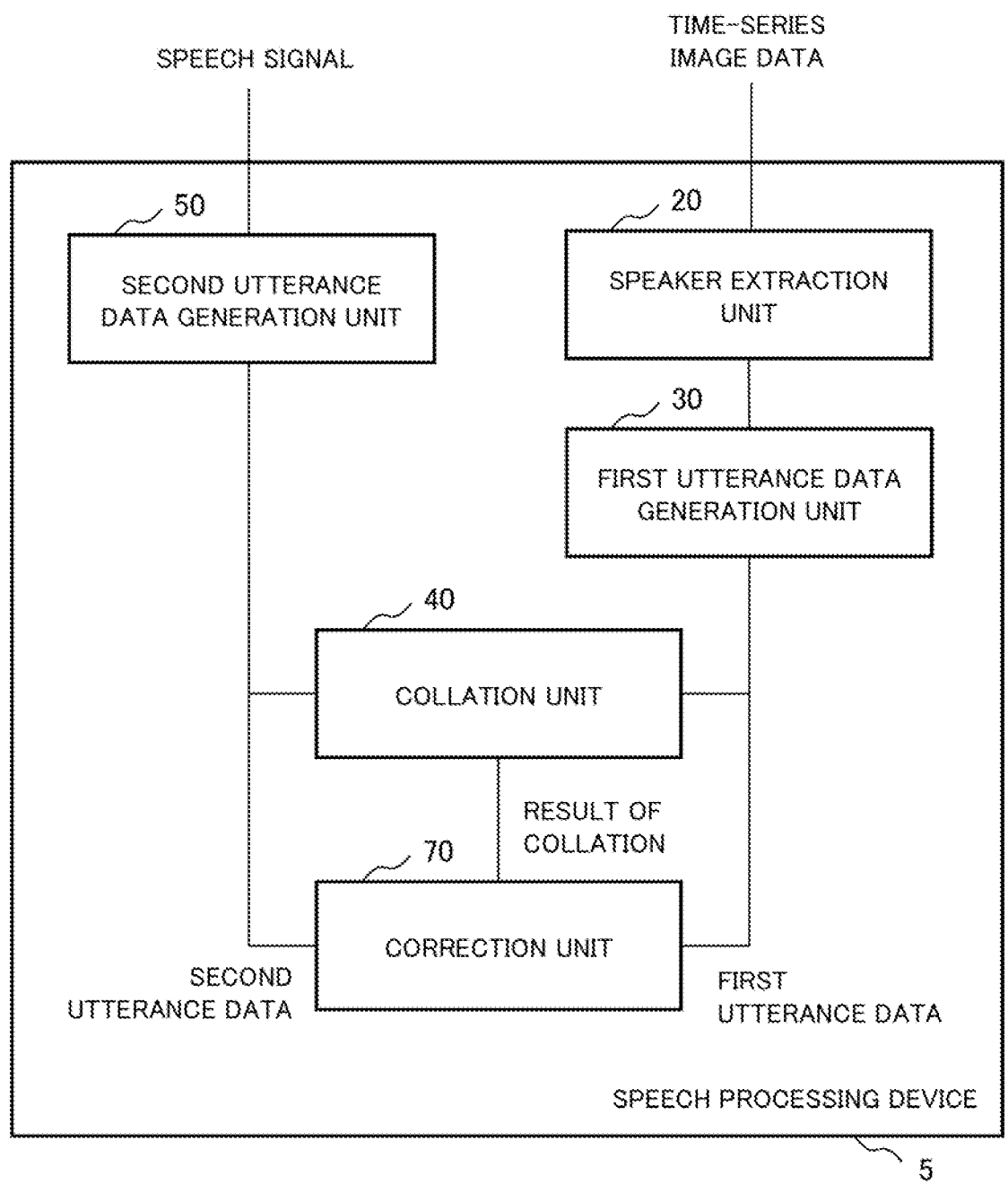
FIG. 8 is a block diagram showing one example of a configuration of a speech processing device according to an example embodiment 5.
Figure 9:
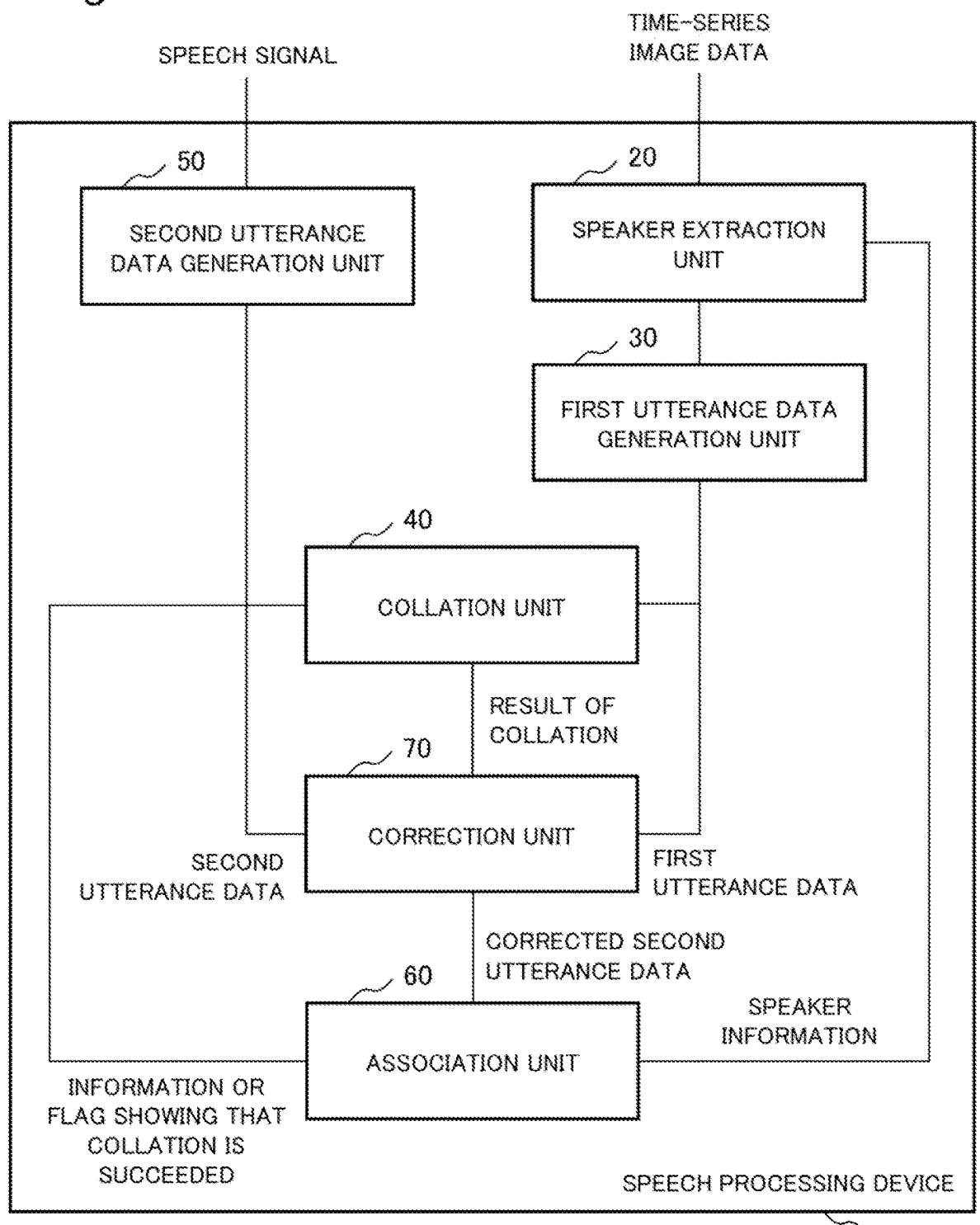
FIG. 9 is a block diagram showing one example of a configuration of one modified example of the speech processing device according to the example embodiment 5.
Figure 10:
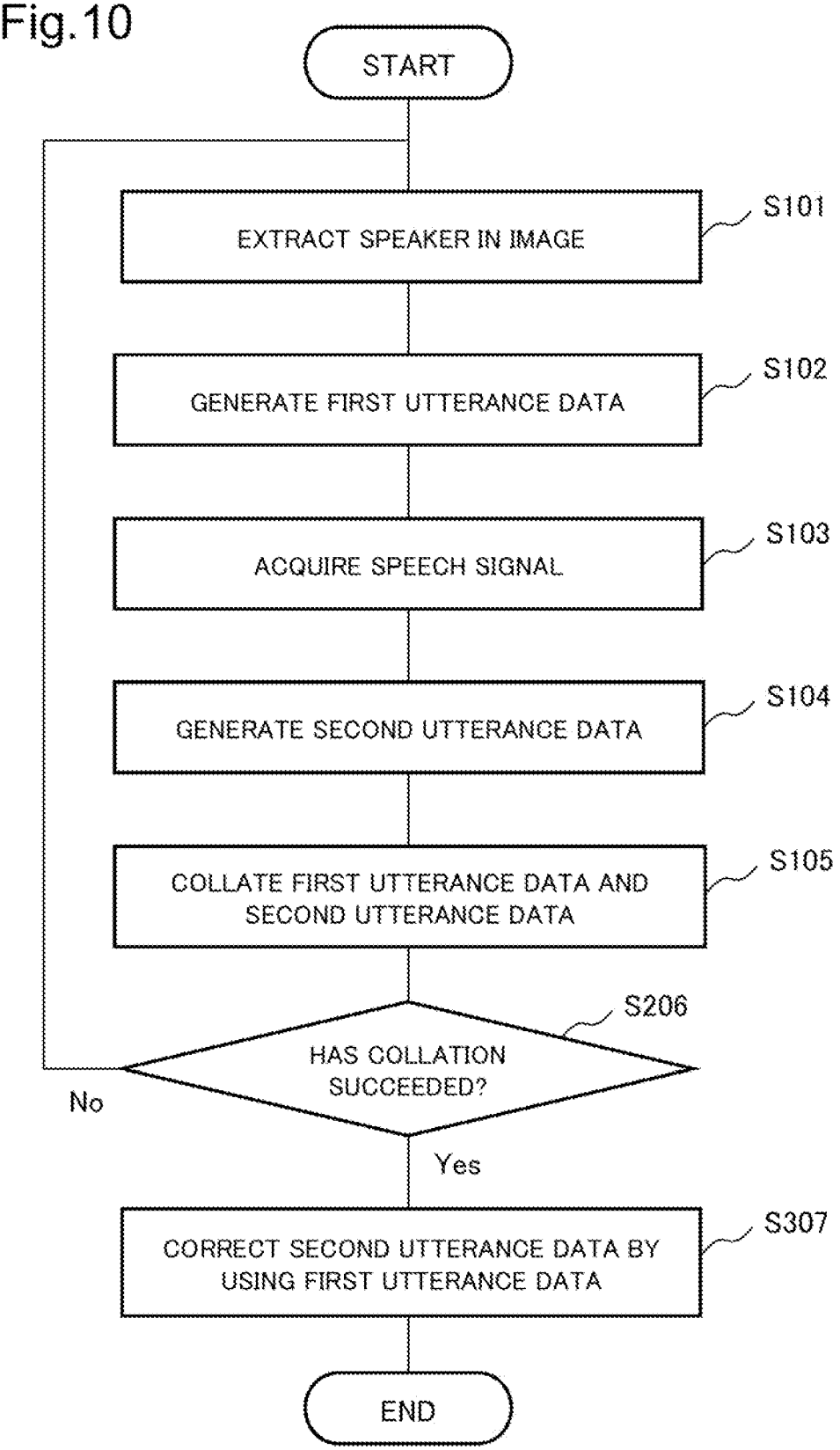
FIG. 10 is a flowchart showing one example of a flow of operation of the speech processing device according to the example embodiment 5.

With reference to FIGS. 8 to 10, an example embodiment 5 will be described. In the present example embodiment 5, a configuration in which second utterance data is corrected by using first utterance data will be described.

Speech Processing Device 5

With reference to FIG. 8, a configuration of a speech processing device 5 according to the present example embodiment 5 will be described. FIG. 8 is a block diagram showing one example of the configuration of the speech processing device 5. As shown in FIG. 8, in addition to a speaker extraction unit 20, a first utterance data generation unit 30, a collation unit 40, and a second utterance data generation unit 50, the speech processing device 5 further includes a correction unit 70.

In other words, the configuration of the speech processing device 5 according to the present example embodiment 5 is different from the configuration of the speech processing device 1 according to the example embodiment 1 in that the speech processing device 5 includes the correction unit 70.

In the present example embodiment 5, not only the collation unit 40 but also the correction unit 70 receives the second utterance data from the second utterance data generation unit 50. In addition, the correction unit 70 receives first utterance data from the first utterance data generation unit 30.

In the present example embodiment 5, as in the example embodiment 1, the second utterance data may be any of the above-described phoneme data and single sound data.

By using the first utterance data received from the first utterance data generation unit 30, the correction unit 70 corrects the second utterance data. The correction unit 70 is one example of a correction means.

The correction unit 70 may store the corrected second utterance data in a storage unit, not shown, on a network server, or in and on both thereof.

Specifically, a specific example of a method in which the correction unit 70 corrects the second utterance data by using the first utterance data will be described below.

First, a case where the second utterance data is the phoneme data, that is, a case where the second utterance data is the information showing the phoneme or phonemes associated to the speech signal and the arrangement order of the phoneme or phonemes will be described below.

Method of Correction: Example 1

In the present example 1, the correction unit 70 compares a phoneme or phonemes included in the first utterance data and an associated phoneme or phonemes included in phoneme data which is the second utterance data. The associated phoneme or phonemes are the phoneme or phonemes whose added order numbers are the same. In particular, the correction unit 70 compares a vowel included in the first utterance data and associated vowel included in the phoneme data which is the second utterance data.

In a case where the vowels of both (that is, the first utterance data and the second utterance data) are the same as each other, the correction unit 70 keeps the vowel of the second utterance data as it is.

On the other hand, in a case where the vowels of the both are different from each other, the correction unit 70 replaces the vowel included in the second utterance data with the associated vowel of the first utterance data. As described above, the correction unit 70 corrects the second utterance data by using the first utterance data.

Method of Correction: Example 2

In the present example 2, the correction unit 70 replaces a phoneme whose SN ratio (S/N) or likelihood is smaller than a threshold value, among the phoneme or phonemes included in the second utterance data, with an associated phoneme of the first utterance data.

Subsequently, a case where the second utterance data is the above-described single sound data, that is, a case where the second utterance data is information showing a single sound or single sounds included in the speech signal and arrangement order of the single sound or single sounds will be described below.

Method of Correction: Example 3

In the present example 3, the correction unit 70 adds a weight in accordance with an associated phoneme of the first utterance data to a likelihood of each of plurality of candidates of single sounds included in the second utterance data and based on the likelihood with the weight added, selects one of the plurality of candidates of the single sounds of the second utterance data.

For example, it is supposed that a likelihood of a first candidate of a certain single sound included in the second utterance data is a and a likelihood of a second candidate of the same single sound is A. On the other hand, it is supposed that an associated phoneme of the first utterance data is the same as the phoneme of the first candidate. In this case, the correction unit 70 provides a weight X ($>1$) for the likelihood of the first candidate and provides a weight y ($\le 1$) for the likelihood of the second candidate.

The correction unit 70 compares a magnitude of a likelihood $X \times a$ of the first candidate with the weight added and a magnitude of a likelihood $y \times A$ of the second candidate with the weight added. The correction unit 70 selects the candidate whose magnitude of the likelihood with the weight added is large.

Modified Example

With reference to FIG. 9, one modified example of the speech processing device 5 according to the present example embodiment 5 will be described. FIG. 9 is a block diagram showing one example of a configuration of a speech processing device 5A according to one modified example.

As shown in FIG. 9, the speech processing device 5A includes a first utterance data generation unit 30, a collation unit 40, a second utterance data generation unit 50, a correction unit 70, and an association unit 60. In other words, the configuration of the speech processing device 5A according to the present modified example is different from the configuration of the speech processing device 5 in that the speech processing device 5A further includes the association unit 60.

The association unit 60 associates speaker information to identify a speaker in image data with second utterance data corrected by the correction unit 70. The association unit 60 is one example of an association means.

Specifically, the association unit 60 receives the speaker information from the speaker extraction unit 20. The association unit 60 receives corrected second utterance data from the correction unit 70. The association unit 60 receives information or a flag showing that collation between the first utterance data and the second utterance data has succeeded from the collation unit 40.

In a case where the association unit 60 has received the information or the flag showing that the collation between the first utterance data and the second utterance data has succeeded from the collation unit 40, the association unit 60 associates the speaker information received from the speaker extraction unit 20 with the corrected second utterance data received from the correction unit 70.

The association unit 60 associates the corrected second utterance data with the speaker information (for example, a face image of the speaker) received from the speaker extraction unit 20 and stores the associated second utterance data and speaker information in a storage unit 300 or the like (refer to the example embodiment 4).

In a case where the collation unit 40 collates pieces of the first utterance data of a plurality of speakers and the second utterance data, the association unit 60 identifies a combination of only one piece of the first utterance data, whose degree of similarity is the highest, and the second utterance data based on a result of the collation. Then, the association unit 60 associates the speaker information as to one speaker associated to the identified first utterance data with the second utterance data.

The association unit 60 stores the associated speaker information and second utterance data in the storage unit 300 shown in FIG. 6. Alternatively, the association unit 60 may store the associated speaker information and second utterance data on a network server, not shown, or the like.

For example, the association unit 60 provides an ID for a combination of the speaker information and the second utterance data. Then, the association unit 60 stores the combination of the speaker information and the second utterance data together with the ID provided for the combination in the storage unit 300, on the network server, or in and on both thereof.

A speech processing device 5 which does not include the association unit 60 (that is, which is not that in the above-described modified example) will be describe below.

(Operation Flow of Speech Processing Device 5)

With reference to FIG. 10, an operation flow of the speech processing device 5 according to the present example embodiment 5 will be described. FIG. 10 is a flowchart showing one example of the operation flow of the speech processing device 5.

In the flowchart shown in FIG. 10, the operation flow from step S101 to step S105 is in common with the operation flow described in the example embodiment 1. The operation flow in subsequent step S206 is in common with the operation flow described in the example embodiment 4.

Accordingly, in the present example embodiment 5, description as to S101 to S105 and S206 is omitted. A step immediately after step S206 shown in FIG. 10 will be described below.

As shown in FIG. 10, in a case where the collation unit 40 has failed in the collation between the first utterance data and the second utterance data (No in S206), the operation flow of speech processing device 5 returns to step S101. On the other hand, in a case where the collation unit 40 has succeeded in the collation between the first utterance data and the second utterance data (Yes in S206), the correction unit 70 corrects the second utterance data received from the second utterance data generation unit 50 by the first utterance data received from the first utterance data generation unit 30 (S307).

Thereafter, the correction unit 70 may output the corrected second utterance data. In the above-described one modified example, the correction unit 70 transmits the corrected second utterance data to the association unit 60. The association unit 60 associates the speaker information (for example, the face image data of the speaker) received from the speaker extraction unit 20 with the second utterance data corrected by the correction unit 70 and stores the associated speaker information and second utterance data in the storage unit 300 (see FIG. 6) or the like.

Then, the operation of the speech processing device 5 according to the present example embodiment 5 is finished.

Effect of the Present Example Embodiment

In the configuration of the present example embodiment, the speaker extraction unit 20 extracts the region of the speaker from the image. The first utterance data generation unit 30 generates the first utterance data showing the contents of the utterance of the speaker based on the shapes of lips of the speaker. The second utterance data generation unit 50 generates the second utterance data showing the contents of the utterance of the speaker based on the speech signal associated to the utterance of the speaker. The collation unit 40 collates the first utterance data and the second utterance data. Thus, it is made possible to perform processing in consideration of influence of noise with respect to the speech made by the utterance of a person.

Furthermore, in a case where the collation between the first utterance data and the second utterance data has succeeded, the correction unit 70 corrects the second utterance data by using the first utterance data. Accordingly, accuracy at which the contents of the utterance are reproduced form the speech signal is enhanced.

Example Embodiment 6

Figure 11:
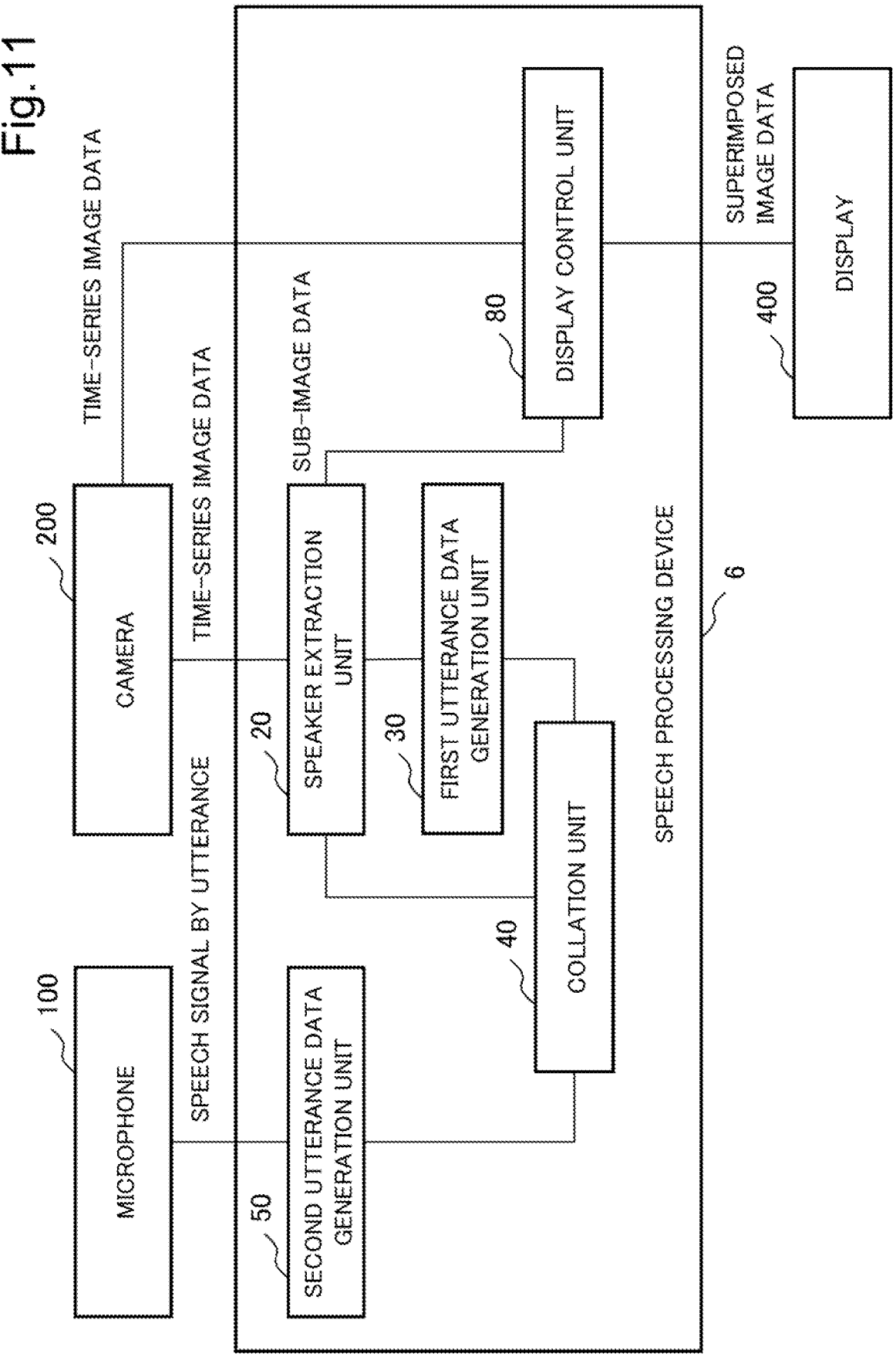
FIG. 11 is a block diagram showing one example of a configuration of a system according to an example embodiment 6.
Figure 12:
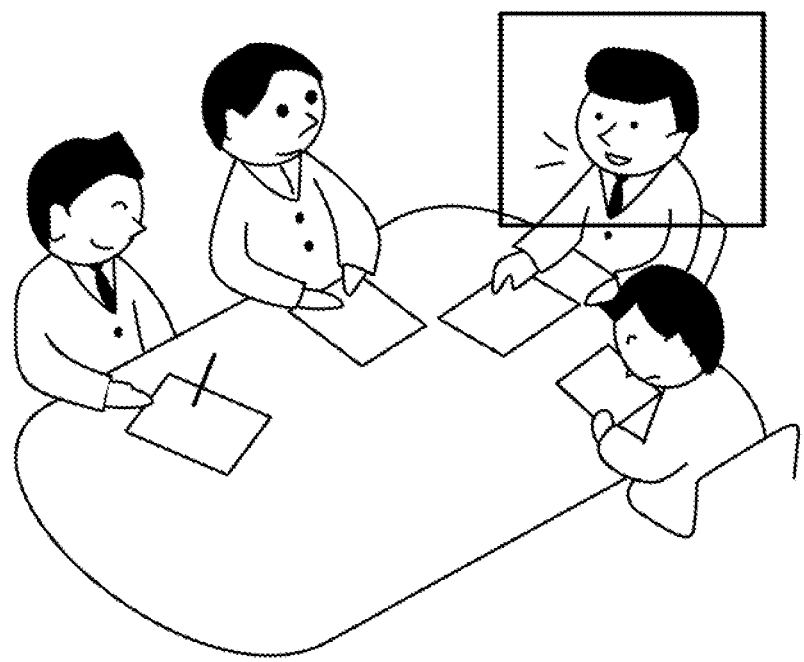
FIG. 12 is one example of displaying made by a display which the system according to the example embodiment 6 includes.

With reference to FIGS. 11 and 12, an example embodiment 6 will be described. In the present example embodiment 6, a configuration of a system including a speech processing device 6 will be described.

The system may include any of the speech processing device 1 to the speech processing device 5 described in the example embodiment 1 to the example embodiment 5, instead of the speech processing device 6 according to the present example embodiment 6.

Configuration of System

With reference to FIG. 11, a configuration of the system according to the present example embodiment 6 will be described. FIG. 11 is a block diagram showing one example of the configuration of the system. As shown in FIG. 11, in addition to the speech processing device 6, the system includes a microphone 100, a camera 200, and a display 400. All or a part of the system according to the present example embodiment 6 may be achieved by an intelligent camera (for example, which is an IP camera or a network camera, which includes an analysis function thereinside, and is also referred to as a smart camera or the like).

Speech Processing Device 6

In addition to a speaker extraction unit 20, a first utterance data generation unit 30, and a collation unit 40, the speech processing device 6 according to the present example embodiment 6 further includes a display control unit 80. In other words, the configuration of the speech processing device 6 according to the present example embodiment 6 is different from the configuration of the speech processing device 1 according to the example embodiment 1 in that the speech processing device 6 includes the display control unit 80.

The microphone 100 collects sound of speech (speaking) made by utterance of a speaker and generates a speech signal associated to the utterance of the speaker. The microphone 100 includes one microphone or a plurality of microphones. The microphone 100 transmits the speech signal associated to the speech made by the utterance to a second utterance data generation unit 50.

The camera 200 is installed in a location targeted for imaging (for example, an inside of a meeting room). The camera 200 images the location targeted for imaging and a person who is present in the location targeted for imaging and transmits time-series image data obtained by imaging (for example, a frame image of a moving image shot in a certain period of time or a plurality of still images shot at intervals of predetermined periods of time) to the speaker extraction unit 20 and the display control unit 80.

In the present example embodiment 6, the collation unit 40 transmits a result of collation between first utterance data and second utterance data to the speaker extraction unit 20.

In a case where the speaker extraction unit 20 has received, from the collation unit 40, a result showing that the collation unit 40 has succeeded in the collation between the first utterance data and the second utterance data, the speaker extraction unit 20 generates image data for superimposition, which includes a figure showing a region including the speaker (hereinafter, referred to as sub-image data). Then, the speaker extraction unit 20 transmits the generated sub-image data to the display control unit 80.

In a case where the speaker extraction unit 20 has received, from the collation unit 40, a result showing that the collation unit 40 has failed in the collation between the first utterance data and the second utterance data, the speaker extraction unit 20 does not generate the sub-image data.

The display control unit 80 receives the time-series image data from the camera 200. In a case where the display control unit 80 has not received the sub-image data from the speaker extraction unit 20, the display control unit 80 converts the time-series image data received from the camera 200 to a format which the display 400 can display and causes the display 400 to display a display image.

On the other hand, in a case where the display control unit 80 has received the sub-image data from the speaker extraction unit 20, the display control unit 80 superimposes the received sub-image data on the time-series image data, converts the superimposed image data to a format which the display 400 can display, and causes the superimposed image to be displayed on the display 400. The display control unit 80 is an example of a display control means. A specific example of the superimposed image will be described below.

One Example of Superimposed Image

FIG. 12 shows one example of the superimposed image generated by the display control unit 80 and displayed on the display 400.

In the superimposed image shown in FIG. 12, around a face of a speaker (a person who is present in an upper right position in FIG. 12), a rectangular figure is displayed. This rectangular figure is one example of the above-described sub-image data. A user sees the superimposed image displayed on the display 400, thereby allowing the user to easily identify the speaker.

In the superimposed image, a shape and a pattern of the figure indicating the speaker (for example, hatching in the figure or a color, a thickness or a kind of a line configuring the figure) are not limited to the rectangle shown in FIG. 12. In another example, the figure indicating the speaker may be an arrow facing the speaker.

Effect of the Present Example Embodiment

In the configuration of the present example embodiment, the speaker extraction unit 20 extracts the region of the speaker from the image. The first utterance data generation unit 30 generates the first utterance data showing the contents of the utterance of the speaker based on the shapes of lips of the speaker. The second utterance data generation unit 50 generates the second utterance data showing the contents of the utterance of the speaker based on the speech signal associated to the utterance of the speaker. The collation unit 40 collates the first utterance data and the second utterance data.

Thus, processing in consideration of influence of noise with respect to the speech made by the utterance of a person can be performed.

Furthermore, the display control unit 80 causes the superimposed image with the figure, showing the region including the speaker, superimposed on the image to be displayed on the display 400. Therefore, the user can easily identify the speaker from the superimposed image on the display 400.

Example Embodiment 7

Hereinafter, with reference to FIG. 13, an example embodiment 7 will be described.

As to Hardware Configuration

Constituent components of each of the speech processing devices described in the example embodiments 1 to 6 show blocks of functional units. One part or all of these constituent components are achieved by, for example, an information processing device 900 as shown in FIG. 13. FIG. 13 is a block diagram showing one example of a hardware configuration of the information processing device 900. The information processing device 900 shows, for example, an internal configuration of an intelligent camera.

Figure 13:
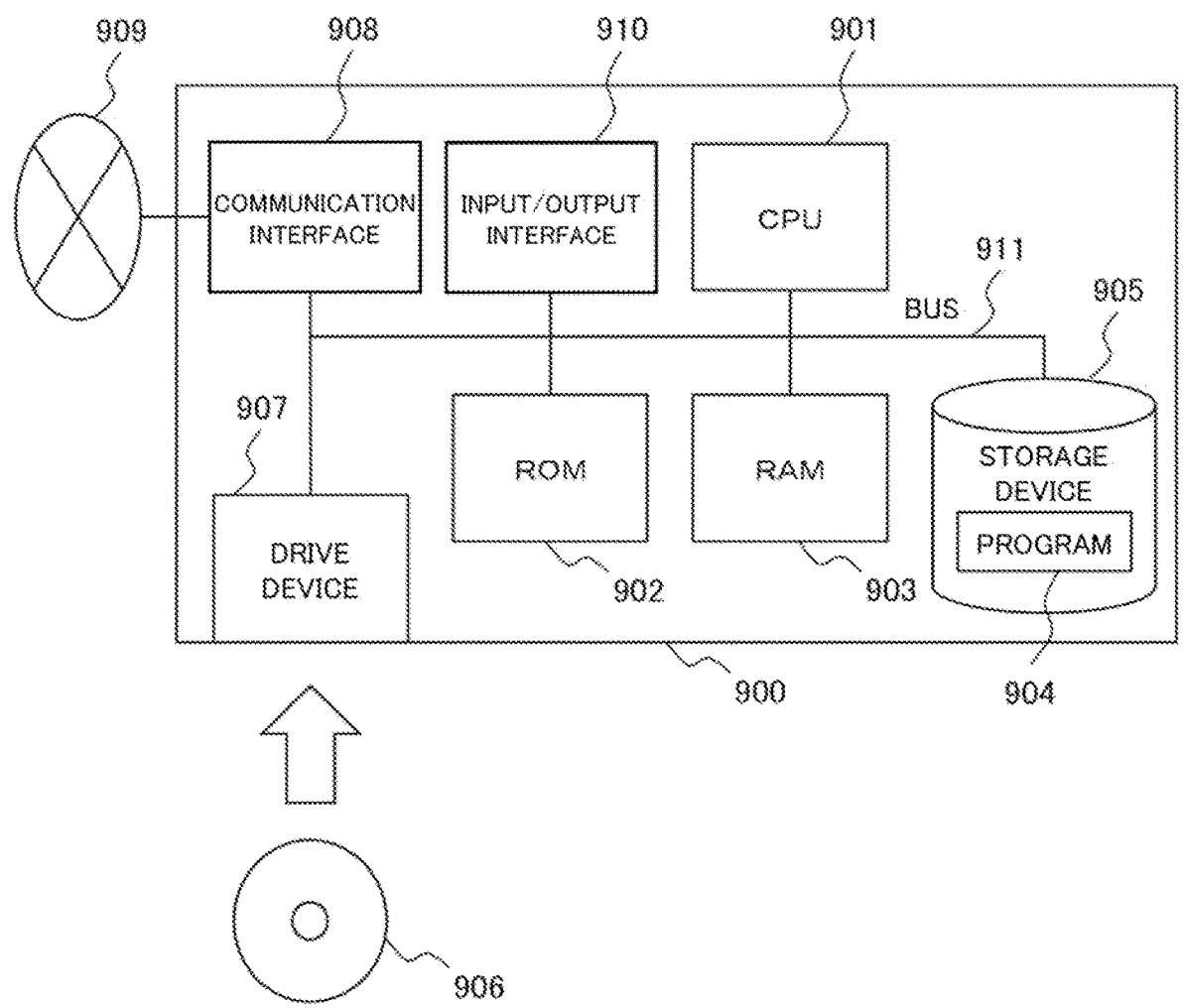
FIG. 13 is a diagram showing one example of a hardware configuration of an information processing device according to an example embodiment 7.

As shown in FIG. 13, the information processing device 900 includes, as one example, the following components.

CPU (Central Processing Unit) 901
ROM (Read Only Memory) 902
RAM (Random Access Memory) 903
Program 904 loaded to RAM 903
Storage device 905 in which the program 904 is stored
Drive device 907 which performs reading/writing from/to a recording medium 906
Communication interface 908 which connects to a communication network 909
Input/output interface 910 which inputs and outputs data
Bus 911 which connects constituent components The CPU 901 reads and executes the program 904 which achieves functions of the constituent components, thereby achieving the constituent components of each of the speech processing devices described in the example embodiments 1 to 6. The program 904 which achieves of the functions of the constituent components has been previously stored, for example, in the storage device 905 or the ROM 902, as needed, the CPU 901 loads the program 904 to the RAM 903, and the program 904 is executed. The program 904 may be supplied via the communication network 909 to the CPU 901 or the program 904 may have been previously stored in the recording medium 906 and the drive device 907 may read the program 904 and may supply the program 904 to the CPU 901.

Effect of the Present Example Embodiment

In the configuration of the present example embodiment, the speech processing device described in each of the example embodiments is achieved as hardware. Accordingly, effect similar to the effect described in each of the example embodiments can be exhibited.

Supplementary Note

Although one part or all of the above-described example embodiments (and examples) may be described as in the following supplementary notes, the following supplementary notes are merely examples. The one part or all of the above-described example embodiments (and examples) are not limited to configurations described in the following supplementary notes.

Supplementary Note 1

A speech processing device including:
a speaker extraction means configured to extract a region of a speaker from an image;
a first utterance data generation means configured to generate first utterance data showing contents of utterance of the speaker based on shapes of lips of the speaker;
a second utterance data generation means configured to generate second utterance data showing contents of utterance of the speaker based on a speech signal being associated to the utterance of the speaker; and
a collation means configured to collate the first utterance data and the second utterance data.

Supplementary Note 2

The speech processing device according to a supplementary note 1, wherein
the first utterance data generation means includes:
a viseme discrimination means configured to discriminate a viseme from the shapes of lips of the speaker; and
a viseme-phoneme conversion means configured to convert the viseme to a phoneme and to generate the first utterance data including one phoneme or a plurality of phonemes.

Supplementary Note 3

The speech processing device according to a supplementary note 1 or 2, wherein
the second utterance data generation means includes:
a characteristic extraction means configured to extract a characteristic from an inputted speech signal; and
a speech signal-phoneme conversion means configured to convert the characteristic of the speech signal to an associated phoneme and to generate the second utterance data including one phoneme or a plurality of phonemes.

Supplementary Note 4

The speech processing device according to a supplementary note 1 or 2, wherein
the second utterance data generation means includes
a single sound extraction means configured to extract a single sound being included in an inputted speech signal and to generate the second utterance data including one single sound or a plurality of single sounds.

Supplementary Note 5

The speech processing device according to any one of supplementary notes 1 to 4, wherein
the speaker extraction means generates speaker information to identify the speaker being extracted from the image, the speech processing device further including
an association means configured to associate the speaker information and the second utterance data based on a result of the collation.

Supplementary Note 6

The speech processing device according to a supplementary note 5, wherein
the first utterance data generation means generates a plurality of pieces of the first utterance data based on shapes of lips of a plurality of speakers in the image,
the collation means collates each of the plurality of pieces of the first utterance data and the second utterance data, and
the association means associates the speaker information pertinent to any one of the plurality of speakers and the second utterance data based on the result of the collation.

Supplementary Note 7

The speech processing device according to any one of supplementary notes 1 to 6, further including
a correction means configured to correct the second utterance data by using the first utterance data in a case where collation between the first utterance data and the second utterance data has succeeded.

Supplementary Note 8

The speech processing device according to any one of supplementary notes 1 to 7, further including
a display control means configured to cause a superimposed image to be displayed on a display, a figure showing a region being superimposed on the image in the superimposed image, the region including the speaker.

Supplementary Note 9

A speech processing method including:
extracting a region of a speaker from an image;
generating first utterance data showing contents of utterance of the speaker based on shapes of lips of the speaker;
generating second utterance data showing contents of utterance of the speaker based on a speech signal being associated to the utterance of the speaker; and
collating the first utterance data and the second utterance data.

Supplementary Note 10

A recording medium having stored therein a program being configured to cause a computer to execute:
extracting a region of a speaker from an image;
generating first utterance data showing contents of utterance of the speaker based on shapes of lips of the speaker;
generating second utterance data showing contents of utterance of the speaker based on a speech signal being associated to the utterance of the speaker; and
collating the first utterance data and the second utterance data.

Supplementary Note 11

The speech processing device according to a supplementary note 5 or 6, wherein
the speaker information is at least one of attribute information of the speaker, position information of the speaker, a face image of the speaker, and the first utterance data.

While this disclosure has been particularly shown and described with reference to exemplary embodiments thereof, this disclosure is not limited to these embodiments. It will be understood by those of ordinary skill in the art that various changes in form and details may be made therein without departing from the spirit and scope of this disclosure as defined by the claims.

This application is based upon and claims the benefit of priority from Japanese patent application No. 2019-142951, filed on Aug. 2, 2019, the disclosure of which is incorporated herein in its entirety by reference.

REFERENCE SIGNS LIST 1 speech processing device
2 speech processing device
3, 3A speech processing device
4, 4A speech processing device
5, 5A speech processing device
6 speech processing device
20 speaker extraction unit
30 first utterance data generation unit
31 viseme discrimination unit
32 viseme-phoneme conversion unit
40 collation unit
50 second utterance data generation unit
60 association unit
70 correction unit
80 display control unit
250 second utterance data generation unit
252 characteristic extraction unit
253 speech signal-phoneme conversion unit
300 storage unit
350 second utterance data generation unit
351 single sound extraction unit
400 display

What is claimed is:

1. A speech recognition device comprising:
a memory storing a computer program; and
at least one processor configured to run the computer program to execute to:
extract a region of a speaker from among a plurality of speakers in an image, wherein at least two of the plurality of speakers are speaking simultaneously;
generate first utterance data showing contents of utterance of the speaker based on shapes of lips of the speaker;
generate second utterance data showing the contents of utterance of the speaker based on a speech signal being associated to the utterance of the speaker; and
collate the first utterance data and the second utterance data,
wherein the at least one processor is configured to run the computer program to execute to:
generate speaker information to identify the speaker being extracted from the image;
generate a plurality of pieces of the first utterance data based on shapes of lips of the plurality of speakers in the image; and
collate each of the plurality of pieces of the first utterance data and the second utterance data, and
wherein the at least one processor is further configured to run the computer program to execute to:
associate the speaker information pertinent to any one of the plurality of speakers and the second utterance data based on the result of the collation resulting from the collating of the first utterance data and the second utterance data; and
store the associated speaker information and second utterance data in a storage.

2. The speech recognition device according to claim 1, wherein
the at least one processor is configured to run the computer program to execute to:
discriminate a viseme from the shapes of lips of the speaker; and
convert the viseme to a phoneme and to generate the first utterance data including one phoneme or a plurality of phonemes.

3. The speech recognition device according to claim 1, wherein
the at least one processor is configured to run the computer program to execute to:
extract a characteristic from an inputted speech signal; and
convert the characteristic of the inputted speech signal to an associated phoneme and to generate the second utterance data including one phoneme or a plurality of phonemes.

4. The speech recognition device according to claim 1, wherein
the at least one processor is configured to run the computer program to execute to:
extract a single sound being included in an inputted speech signal and to generate the second utterance data including one single sound or a plurality of single sounds.

5. The speech recognition device according to claim 1, wherein
the speaker information is at least one of attribute information of the speaker, position information of the speaker, a face image of the speaker, and the first utterance data.

6. The speech recognition device according to claim 1, further comprising
the at least one processor is configured to run the computer program to execute to:
correct the second utterance data by using the first utterance data in a case where the collation resulting from the collating between the first utterance data and the second utterance data has succeeded.

7. The speech recognition device according to claim 1, further comprising
the at least one processor is configured to run the computer program to execute to:
cause a superimposed image to be displayed on a display, a figure showing a region being superimposed on the image in the superimposed image, the region including the speaker.

8. A speech recognition method comprising:
extracting a region of a speaker from among a plurality of speakers in an image, wherein at least two of the plurality of speakers are speaking simultaneously;
generating first utterance data showing contents of utterance of the speaker based on shapes of lips of the speaker;
generating second utterance data showing the contents of utterance of the speaker based on a speech signal being associated to the utterance of the speaker; and
collating the first utterance data and the second utterance data,
wherein the speech recognition method further comprises:
generating speaker information to identify the speaker being extracted from the image;
generating a plurality of pieces of the first utterance data based on shapes of lips of the plurality of speakers in the image; and
collating each of the plurality of pieces of the first utterance data and the second utterance data, and
wherein the speech recognition method further comprises:
associate the speaker information pertinent to any one of the plurality of speakers and the second utterance data based on the result of the collation; and
storing the associated speaker information and second utterance data in a storage.

9. A non-transitory recording medium having stored therein a program being configured to cause a computer to execute:
extracting a region of a speaker from among a plurality of speakers in an image, wherein at least two of the plurality of speakers are speaking simultaneously;
generating first utterance data showing contents of utterance of the speaker based on shapes of lips of the speaker;
generating second utterance data showing the contents of utterance of the speaker based on a speech signal being associated to the utterance of the speaker; and
collating the first utterance data and the second utterance data,
wherein the program is configured to cause the computer to execute:
generating speaker information to identify the speaker being extracted from the image,
generating a plurality of pieces of the first utterance data based on shapes of lips of the plurality of speakers in the image,
collating each of the plurality of pieces of the first utterance data and the second utterance data, and
wherein the program is further configured to cause the computer to execute:
associating the speaker information pertinent to any one of the plurality of speakers and the second utterance data based on the result of the collation; and
storing the associated speaker information and second utterance data in a storage.

* * * * *